United States Patent [19]
Kelly

[11] 4,124,174
[45] Nov. 7, 1978

[54] OPEN-FACE SPINNING REEL

[76] Inventor: James A. Kelly, P.O. Box 1867, Punta Gorda, Fla. 33950

[21] Appl. No.: 797,072

[22] Filed: May 16, 1977

[51] Int. Cl.² ............................................. A01K 89/00
[52] U.S. Cl. ........................ 242/84.2 R; 242/84.1 M; 242/84.5 A
[58] Field of Search ................ 242/84.2 R, 84.21 R, 242/84.1 L, 84.1 M, 84.1 R, 84.5, 84.51, 71.8, 71.9, 74, 77, 77.1, 96, 107.2, 106, 199, 57; 33/127, 128; 116/114 S, 114 AS

[56] References Cited

U.S. PATENT DOCUMENTS

| | | | |
|---|---|---|---|
| 1,685,904 | 10/1928 | Burke | 33/128 |
| 2,734,693 | 2/1956 | Rabezzana | 242/84.21 R |
| 2,739,767 | 3/1956 | Dunkelberger et al. | 242/84.2 R |
| 3,946,963 | 3/1976 | Oberg | 242/84.21 R |

FOREIGN PATENT DOCUMENTS

| | | |
|---|---|---|
| 886,490 | 7/1943 | France. |
| 1,324,300 | 3/1963 | France. |

Primary Examiner—George F. Mautz
Attorney, Agent, or Firm—Duckworth, Hobby, Allen & Pettis

[57] ABSTRACT

An indicator system for conventional open-face spinning reels of the type having a line spool and a drag nut for applying a drag force against rotation of the line spool includes a plurality of drag setting markers spaced about the face of the line spool and corresponding to a desired drag setting for different gauges (lb. Test) of line on the spool. An alignment marker is positioned on the face of the drag nut and an indicator chart is provided on the reel having indicia thereon corresponding to the drag setting marks and indicating the predetermined gauge represented by each drag setting marker. The correct drag is set for the line on the spool by rotating the drag nut to a finger tight position, and then by reverse rotation of the drag nut to align the alignment marker with the correct one of the drag setting markers, as determined by cross-reference to the indicator chart.

9 Claims, 2 Drawing Figures

OPEN-FACE SPINNING REEL

BACKGROUND OF THE INVENTION

1. Field of the Invention

The present invention relates to spinning reels and in particular to systems and methods which are designed to accurately set the drag or braking force for different gauges of fishing line wrapped on the spinning reel.

2. Description of the Prior Art

Conventional open-face spinning reels generally include a rearward housing having a spindle shaft extending through the housing and being rotated by a handle mounted to the side of the housing. The reel further includes a line spool rotatably mounted on the spindle shaft forward of the housing with a drag nut being actually mounted on the extremity of the spindle shaft for applying a drag force against rotation of the line spool. The purpose of this drag force is to provide a brake against rotation of the line spool upon exertion of a force on the end of the line, as when a fish strikes the bait. It is the practice of experienced fishermen to set the drag by tightening the drag nut against the line spool to a finger tight position and then by reverse rotation of the drag nut until such time as the desired drag is achieved. While this technique is suitable for experienced fishermen, it is relatively unsatisfactory for inexperienced fishermen, or when different line gauges are being employed on the line spool. Accordingly, it is an object of this invention to provide means for consistently setting the desired drag for different gauges of fishing line wrapped on the line spool, and for providing a drag setting technique useful for inexperienced fishermen.

There are suggestions in the prior art for employing indicia on the face of the spinning reel to indicate the drag setting. In U.S. Pat. No. 2,739,767, Dunkelburger, et al discloses a digitial technique for permitting the step-by-step adjustment of the drag with means on the front of the spool for indicating the particular adjustment position.

A somewhat similar arrangement is disclosed in U.S. Pat. No. 3,946,963 to Oberg, which likewise discloses a digital indicator arrangement on the face of the line spool for indicating the position of the drag nut with respect to the line spool.

Other prior art patents of interest include the following: U.S. Pat. No. 3,028,115 to Hammer; U.S. Pat. No. 3,23,284,019 to Wood; and U.S. Pat. No. 3,520,488 to Bouthier.

SUMMARY OF THE INVENTION

The present invention contemplates a system and method for setting the drag for an open-face spinning reel.

In a preferred embodiment, the system of the present invention is useful for an open-face spinning reel of the type having a line spool rotatably mounted on a spindle shaft, with a drag nut at the extremity of the shaft for applying a drag force against rotation of the line spool. The indicator system comprises, in combination, a plurality of drag setting markers spaced about the periphery of the face of the line spool adjacent the drag nut, each drag setting marker corresponding to a desired drag setting for a predetermined gauge of fishing line on the line spool. The indication system is further provided with an alignment marker on the face of the drag nut and an indicator chart having multiple indicia thereon, each indicia corresponding to the predetermined gauge of fishing line on said spool and further corresponding to the respective one of the drag setting markers.

In accordance with the method of the present invention, the correct drag setting for fishing line on the line spool may be set by rotation of the drag nut to a finger tight position against the open face of the line spool, and then rotation of the drag nut in a reverse direction to align the alignment marker on the drag nut with the correct one of the drag setting markers, as determined by a cross-reference to the indicator chart.

In accordance with another aspect of the present invention, the inner face of the line spool is provided with means for indicating the proper amount of fishing line to be wrapped thereon. In a preferred embodiment, this fishing line amount indicating means comprises a contrasting concentric ring about the inner face of the line spool.

THE DRAWING

DETAILED DESCRIPTION

Figure 1:
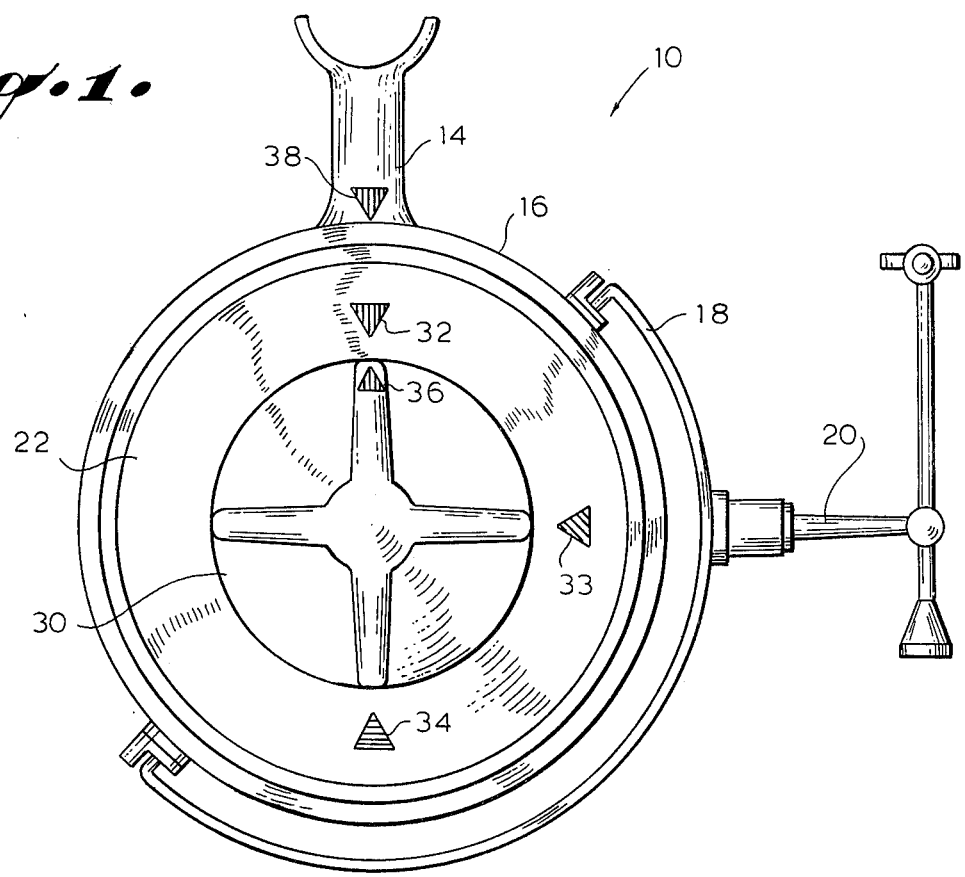
FIG. 1 is a front elevation of a fishing reel incorporating the indicator system of the present invention.

A preferred embodiment of the system and method of the present invention will now be described with reference to FIGS. 1 and 2.

In the drawings, a conventional open-face spinning reel, referred to generally as 10, is shown with the indicator system of the present invention applied thereto. The spinning reel 10 includes a housing 12 having an integral reel seat stand 14 for connecting the reel 10 to a fishing pole (not shown). The spinning reel 10 further includes a line spool 16 axially mounted on a spindle shaft (not shown) extending from the housing 12, the spindle shaft being rotatable upon operation of a handle 20 in a conventional manner. A baler 18 is attached to the rear of the line spool 16 and operates in a well known manner to wind fishing line 27 onto the drum 26 of the line spool 16.

The line spool 16 further includes an inner face 28 and an outer face 22, the outer face 22 constituting the open face of the spinning reel 10. A drag nut 30 is mounted on the extremity of the spindle shaft for rotation against the open face 22 of the line spool 16 to set the drag force in a well known manner, as is described in greater detail above.

An indicator system in accordance with the present invention will now be described. The indicator system includes a plurality of drag setting markers 32, 33 and 34 spaced about the periphery of the open face 22 of the line spool 16. Each drag setting marker 32, 33 and 34 is positioned at a predetermined location which represents the desired drag setting for a particular guage of fishing line mounted on the drum 26 of the line spool 16, as will be described in greater detail below. In order to differentiate between the individual ones of the drag setting markers 32, 33 and 34, each marker is color coded with a different color corresponding to the color designation for a particular gauge of fishing line set forth on an indicator chart 40, described in greater detail below. By way of example, the drag setting marker 32 is shown cross-hatched for the color red, in accordance with the standard cross-hatching for colors as provided in the symbols for draftsmen in the "Rules of Practice in Patent Cases", 1970 Edition. Likewise, the drag setting markers 33 and 34 are cross-hatched for the color green and blue, respectively. However, it will be understood by those skilled in the art that any color combination or other of distinctive indicia may be employed to distinguish between each of the drag setting markers.

Further, the indicating system in accordance with the present invention is provided with an alignment marker 36 mounted on the periphery of the drag nut 30. In this example, the alignment marker 36 has the color red, although any suitable color may be employed. Further, a colored alignment marker 38, of a suitable color, preferably the same as markers 32 and 36, is provided on the forward face of the reel seat stand 14. The indicating system also includes an indicator chart mounted on a flat side face of the housing 12 and includes a chart which depicts the color scheme of the drag setting markers 32, 33 and 34 as well as an indication of the respective line gauge size for each of the corresponding one of the drag setting markers 32, 33 and 34. In the example shown in FIG. 2, the indicator chart 40 includes three indicia, the lowermost indicia having a red mark on the left side thereof and the number "8" which refers to fishing line having an 8 pound test. Likewise, the green indication on the left side of the indicia chart in the middle thereof corresponds to a line gauge of 10 pounds; and the uppermost indicia corresponding to the blue dot relates to a fishing line having a test of 12 pounds.

Figure 2:
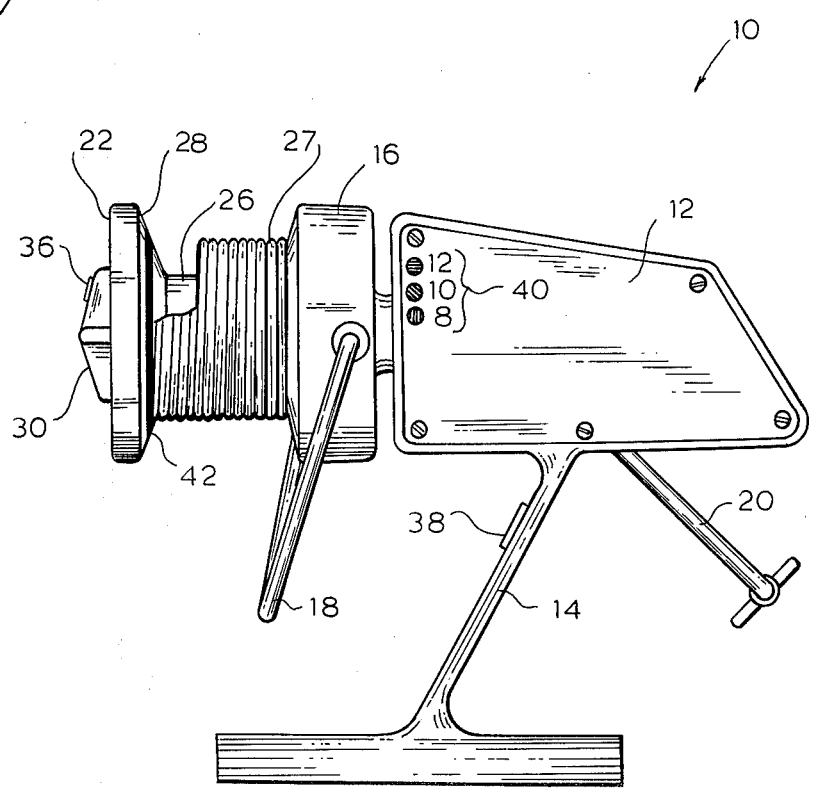
FIG. 2 is a side view of the fishing reel shown in FIG. 1.

As specifically shown in FIG. 2, the spinning reel 10 is provided with a concentric contrasting ring 42 about the inner face 28 of the line spool 16, to indicate the proper amount of fishing line 26 to be wrapped on the spool. This arrangement could also employ a light metal-dark metal inner face, contrasting at the point of proper amount of line.

The manner in which the indicator system of the present invention is utilized to set the correct drag for the fishing line 27 on the line spool 16 will now be described.

Initially, it is assumed that the fishing line 27 is properly wrapped on the line spool 16 to the level of the concentric ring 42 on the inner face 28. Assuming for a moment that the fishing line has a 10 pound test, a review of the indicator chart 40 indicates that the green dot corresponds to the 10 pound test drag setting. (It will, of course, be understood that any line test may be used). First the markers 32, 36 and 38 are aligned, then the drag nut 30 is rotated axially about the spindle shaft in a direction so as to tighten the drag nut 30 against the open face 22 of the line spool 16. When the drag nut 30 has been rotated to a finger tight position, the drag nut is then rotated in a reverse direction until the alignment marker 36 is aligned with the first drag setting marker 32. Rotation of the drag nut 30 is then continued in a reverse direction, until such time as the alignment marker 36 is aligned with the proper one of the drag setting markers 32, 33 and 34; that is, in the specific example of 10 pound test line, the alignment marker 36 is rotated until it is properly aligned with the drag setting marker 33. At this time, the drag is properly set. It will, of course, be understood that the appropriate location of the drag setting markers 32, 33 and 34 is predetermined by the manufacturer of the spinning reel 10. It will further be appreciated by those skilled in the art that the differences in certain types of manufactured open-face spinning reel may require that the alignment marker 36 on the drag nut 30 be rotated more than one complete turn in the reverse direction after return to the original drag setting marker 32 subsequent to rotation of the drag nut to the finger tight position. This will, of course, vary between different spinning reels, and can easily be handled in directions accompanying the reel when distributed.

I claim:

1. An indicator system for open-face spinning reels of the type having a reel seat stand supporting a line spool with fishing line thereon of a particular gauge rotatably mounted on a spindle shaft, and a drag nut at the extremity of said shaft for applying a drag force against rotation of said line spool, said indicating system comprising:
   a first alignment marker on said reel seat stand;
   a plurality of drag setting markers spaced about the periphery of the face of said line spool adjacent said drag nut, each drag setting marker corresponding to a desire drag setting for a predetermined gauge of fishing line on said line spool, one of said drag setting markers representing said particular gauge line on said spool and one of said drag setting markers being preselected for use as an indexing marker during drag setting operations;
   a second alignment marker on the face of said drag nut; an indicator chart having multiple indicia thereon, each indicia corresponding to each predetermined gauge of fishing line and further corresponding to the respective one of said drag setting markers; whereby
   the correct drag setting for line on said line spool may be set by aligning said first alignment marker with said preselected one of said drag setting markers, and by rotating said drag nut to a finger tight position, and then reverse rotation of said drag nut to align said second alignment marker with the correct one of said drag setting markers, as determined by cross reference to said indicator chart.

2. The system recited in claim 1 wherein said drag setting markers and said indicia on said indicator chart have a corrolating color coding.

3. The system recited in claim 1 wherein said indicator chart is mounted on said spinning reel.

4. In combination:
   an open-face spinning reel of the type having a reel seat stand supporting a rotatable line spool with fishing line on said spool of a predetermined gauge, said spinning reel further including a drag nut rotatably mounted coaxial with said line spool for applying a drag force against rotation of said line spool;
   a first alignment marker on said reel seat stand;
   an indicator chart on a face of said spinning reel and having multiple indicia thereon, each indicia corresponding to predetermined gauge of fishing line and one of said indicia corresponding to said fishing line on said line spool;
   a plurality of drag setting markers about the periphery of the open-face of said line spool, each drag setting marker correlating with said indicia on said indicating chart to represent one of the predetermined gauges of fishing line and one of said drag setting markers corresponding to said fishing line of said line spool, one of said drag setting markers being preselected as an indexing marker during drag setting operations; and
   a second alignment marker on the face of said drag nut.

5. The combination recited in claim 4 wherein said line spool further comprises means for indicating the amount of said fishing line to be wrapped thereon.

6. The combination recited in claim 1 wherein said amount indicating means comprises a contrasting concentric ring about the inner-face of said line spool.

7. A method for setting the drag for an open-face spinning reel of the type having a reel seat stand supporting a line spool rotatably mounted on a spindle shaft, with fishing line of a particular gauge on said spool, and a drag nut at the extremity of said shaft for applying a drag force against rotation of said line spool, said method comprising the steps of:

placing a first alignment marker on said seat stand;

placing a plurality of drag setting markers about the periphery of the open-face of said line spool, each drag setting marker being at a point corresponding to a desired drag setting for a different gauge of fishing line; preselecting one of said drag setting markers as an indexing marker during drag setting operations;

placing a second alignment marker on said drag nut;

providing an indicator chart having a multiple indicia thereon, each indicia corresponding to the predetermined gauge of line on said line spool and further corresponding to the respective one of said drag setting markers;

aligning said preselected one of said drag setting markers with said first alignment marker;

axially rotating said drag nut in a first direction to a finger tight position against the open-face of said line spool; and thereafter rotating said drag nut in a second direction opposite to said first direction to align said second alignment marker with one of said drag setting markers as determined by cross reference to said indicator chart.

8. An indicator system for open-face spinning reels of the type having a reel seat stand supporting a line spool with fishing line thereon of a particular gauge rotatably mounted on a spindle shaft, and a drag nut at the extremity of said shaft for applying a drag force against rotation of said line spool, said indicating system comprising:

a first alignment marker on said reel seat stand;

a plurality of drag setting markers spaced about the periphery of the face of said line spool adjacent said drag nut, each drag setting marker corresponding to a desired drag setting for a predetermined gauge of fishing line on said line spool, one of said drag setting markers representing said particular gauge line on said spool and one of said drag setting markers being preselected as an indexing marker during drag setting operations;

a second alignment marker on the face of said drag nut; and wherein the correct drag setting for said particular gauge line on said line spool may be set by aligning said first alignment marker with said indexing marker, and by rotating said drag nut to a finger tight position, and then reverse rotation of said drag nut to align said second alignment marker with the one of said drag setting markers representative of said line on said spool.

9. An indicator system for open-face spinning reels of the type having a reel seat stand supporting a line spool with fishing line thereon of a particular gauge rotatably mounted on a spindle shaft, and a drag nut at the extremity of said shaft for applying a drag force against rotation of said line spool, said indicating system comprising:

a first alignment marker on said reel seat stand;

a second alignment marker marker on the face of said drag nut;

an indexing marker at a preselected point on the face of said spool;

indicating means on the face of said line spool for representing the proper drag setting for a particular gauge of line on said reel; and wherein the correct drag setting for said particular gauge of line on said spool may be set by first aligning said indexing marker with said first alignment marker on said reel seat stand, and by rotating said drag nut to a finger type position, and then reverse rotation of said drag nut to align said second alignment marker with said indicating means representative of said particular gauge of line on said spool.

* * * * *